United States Patent [19]

Kuechler

[11] 4,022,749
[45] May 10, 1977

[54] FORMATION OF COMPOSITE PARTICULATE MATERIAL USING HIGH ENERGY ROTARY IMPACT MILLING

[75] Inventor: William L. Kuechler, North Haven, Conn.

[73] Assignee: Entoleter, Inc., New Haven, Conn.

[22] Filed: Mar. 7, 1975

[21] Appl. No.: 556,401

Related U.S. Application Data

[63] Continuation of Ser. No. 667,414, Sept. 13, 1967, abandoned, which is a continuation-in-part of Ser. No. 368,154, May 18, 1964, abandoned.

[52] U.S. Cl. .......................... 260/42.18; 106/198; 106/241; 260/17.5; 260/37 R; 260/37 EP; 260/37 N; 260/37 SB; 260/38; 260/40 R; 260/42; 260/762

[51] Int. Cl.$^2$ .................. C08J 3/20; C08K 3/34; C08K 3/40

[58] Field of Search ............... 260/37 R, 37 EP, 38, 260/39, 40 R, 42 R, 42.46, 42.57, 37 N; 106/198, 241

[56] References Cited

UNITED STATES PATENTS

| 2,497,346 | 2/1950 | Collins | 106/198 |
|---|---|---|---|
| 2,661,299 | 12/1953 | Paul et al. | 106/198 |
| 2,947,646 | 8/1960 | Devaney et al. | 260/42 |
| 2,993,799 | 7/1961 | Blake | 260/42 |

FOREIGN PATENTS OR APPLICATIONS 675,907    12/1963    Canada .................. 260/42

OTHER PUBLICATIONS

Renfrew et al. "Polythene", Second Edition, 1960, pp. 420–422.
Maddern, "Mixing, Centrifigal Impact, The Encyclopedia of Plastics Equipment", Reinhold Publ. Co., 1964, pp. 356–360.

Primary Examiner—Allan Lieberman
Attorney, Agent, or Firm—Boris Haskell

[57] ABSTRACT

The formation of composite materials is disclosed, using high energy rotary impact milling. The illustrations utilize polymer resin particles as the matrix material, and solid particle fillers. Ultra-small particle sizes are used for both the matrix and filler materials. When the resultant materials are processed by usual forming techniques, the resultant composite materials possess strength properties approximately equivalent to those of the unfilled matrix material, even though heavily filled.

13 Claims, 6 Drawing Figures

INVENTOR
WILLIAM L KUECHLER

BY Parin, Haskell & Levine

ATTORNEYS

FIG.4

△ EXTRUDED SAMPLES
○ NON-EXTRUDED SAMPLES
* A TWO-PASS EXTRUDATE

INVENTOR
WILLIAM L. KUECHLER

BY

ATTORNEYS

FORMATION OF COMPOSITE PARTICULATE MATERIAL USING HIGH ENERGY ROTARY IMPACT MILLING

This is a continuation of copending application Ser. No. 667,414 filed Sept. 13, 1967, which was a continuation-in-part of application Ser. No. 368,154 copending therewith and filed May 18, 1964, both filed by William L. Kuechler, and both now abandoned.

The present invention relates to composite materials, and particularly to composites having substrates or matrices of polymer and like materials with particulate additives dispersed therein. The composites of the present invention are generally solid non-foraminous materials, partaking of the basic properties of the continuous phase plastic matrix, modified however by the presence of the additives, particularly when present in large amounts, such as greater than about twenty percent, and up to 50 percent and even more, by weight.

It is generally known to incorporate various types of particulate fillers in polymeric materials to combine the properties of the polymer substrate and the filler, and/or to dilute the polymer and reduce the cost of the material. A common type of filler employed is glass fibers, wherein macro sized fibers of glass (e.g., of the order of ¼ inch in length and 20–30 microns in diameter) are blended into a plastic polymeric base to enhance the tensile and flexural strength of the polymer when molded or formed into shape, such as bars, rods, sheets, etc. Usually these fillers are incorporated in polymeric substrate materials only in relatively minor percentages, with the substrate retaining its own basic plastic properties, modified only to a small extent by the properties of the filler material. Efforts to produce useful composites having large percentages of particulate filler materials dispersed in plastic substrates have been generally unsuccessful, because the large quantities of filler tend to destroy or so diminish the plastic properties of the substrate as to render the composite material essentially useless for the usual purposes for which plastic and polymeric materials are employed.

In accordance with the present invention, it has been found that unusually large percentages of discrete particulate additive or filler materials can be incorporated into plastic or polymeric type substrates, to even as high as or higher than 70% additive, while still retaining the basic plastic characteristics of the matrix material in the composite. In these composites, the properties are usually modified from those of the unfilled plastic material, sometimes improving their plastic properties, and in other instances providing different characteristics from those of either the substrate or the additive material. For example, highly filled plastics of the present invention have been formed which provide better molding properties than the unfilled polymer, greater tensile strength, increased lubricity and improved hand and feel, and greater cohesiveness, flexural strength and resiliency than the original unfilled plastic. Thus, in some instances, pursuant to the present invention these fillers or additives become adjuvants. The nature and degree of change of properties is found to vary with the particular substrate or matrix material employed, and with the particular additive and percentages of additive utilized.

The nature and degree of changes in properties observed in practicing the present invention, leads one to the conclusion that the particulate fillers or additives are subject to more than a mere encapsulation within the plastic matrix when these ingredients are combined in the manner prescribed by this invention. Rather, it appears that there is a true combination between the individual additive particles and the matrix material, so that the resultant composite is something more than the mere additive combination of the two ingredients, and is indeed a third material having its own identity and possessed of properties unexpectedly different from either of the starting materials. It is thought that this new combination of materials is effected by several factors, each factor contributing to the results obtained, with maximum benefits being had when all factors are combined, although the presence of all factors is not essential when less than the maximum benefits are desired. A first of these factors is the particle size of the filler or additive ingredient. The filler ingredient should be composed of very small particles, preferably submicro in size. Secondly, the filler particles should be dispersed in the matrix material in a substantially non-agglomerated state and with a high degree of uniformity, so that the resultant composite is substantially homogeneous. And a third factor is the application of very high compressive pressures between the filler particles and the matrix material in the formation of the composite so as to effect a tenacious adhesion bonding between the filler particles and the matrix material.

The three foregoing factors are not entirely independent considerations, for they appear to bear a relationship to one another. For example, the submicro size of the filler particles appears to act in concert with the high pressure adhesion bonding, because the small particle size affords an extremely large surface area per unit mass of additives for effecting the desired bonding. Furthermore, because the submicro additive particles have a strong cohesion factor and tendency to agglomerate, in order to obtain the benefit of the submicro size of the particles it becomes necessary to deagglomerate the particles and disperse them substantially individually throughout the matrix material, otherwise the agglomerated masses tend to function somewhat like larger filler particles, but without the particle integrity of the larger particle, resulting in a fault or weak point in the composite material.

The foregoing analysis of the contributing factors of the present invention and of their relationship is presented only as a suggested theory, borne out by the available experimental evidence. However, as a suggested theory, it is not intended that the present invention be necessarily construed or limited in light of these thoughts.

In the practice of the present invention, it is preferred to disperse the filler particles in the matrix material by a rotary impact milling operation. Depending upon the specific form of processing selected, this impact milling may be only for the purpose of deagglomerating and dispersing the filler particles in the substrate or matrix material, using only a reasonably high rotary speed mill. Or the operation may be for the purpose of both dispersing the filler particles in and adhering them to the matrix material with very high compression pressures. In that event, an ultrahigh speed rotary impact mill is employed. In either event, of course the filler and matrix material when milled together should be in particulate form. At the lower milling speeds, the amount of energy imparted to the material appears to function primarily only to deagglomerate the submicro filler particles and to cause the individual filler particles to adhere principally to the surface of the matrix material particles. Subsequent processing of this composite material then imparts the high compressive pressures to the filler and matrix material, to effect the desired adhesive bonding. At the higher milling speeds, the impact pressures obtained from the mill operation are brought to bear upon the particles to effect not only the deagglomeration of filler and adherence of the filler particles to the matrix particles, but also in the same operation sufficiently high impact forces are applied to the particles to drive the filler particles into the matrix particles and to effect the tenacious adhesive bonding between the two materials over large surface areas. Once the requisite bonding is effected between the dispersed filler particles and the matrix material, the composite can be processed through various usual types of forming operations, such as extruding, drawing, molding, casting, rolling, etc., in a manner conventional for the matrix material, to produce sheets, straps, rods, cords, filaments, plates, and various other shapes.

As previously stated, it is an important feature of the present invention to utilize submicro filler particles, by which is meant particles in the micron range of between say a fraction of a micron and a few microns. It has been found that additive particles having at least one dimension of less than a micron are particularly desirable. It is likewise found important for the matrix material particles to be of small size, although the size of the matrix particles is not as critical as the filler particle size. Preferably, the matrix particles should have dimensions of the order of tens of microns. One factor dictating the matrix particle size is the percent of filler to be added, for the smaller the matrix particle size, the larger is the surface area per unit mass available for impingement of individual filler particles without agglomeration of the particles on the surface of the matrix particles. Therefore, the larger the percent of filler to be added to the matrix material, the smaller the matrix particles should be. The size of the matrix particles are further limited by the fact that if the matrix particles are too large, it is apparent that the filler particles will concentrate at or near the surface of the matrix particles, while none or very few will penetrate to the centers, thereby resulting in a non-homogeneous composite even if the filler particles are completely deagglomerated.

In the practice of the present invention, it is preferred to utilize for the matrix material, non-metallic solids, integratable via an intermediate fluid, molten, plastic, gel, or equivalent state. The preferred types of such materials are those polymeric materials which can be formed into discrete plastic particles, preferably of very small size. It is considered that the invention is not limited to any particular class or type of polymer, but may be applied to substantially all types of polymeric materials that can be formed into discrete plastic particles, such as: synthetic thermoplastic resins represented by the polyolefins, polyamides, polyesters, and polyacrylates; synthetic thermosetting resins represented by the epoxies and phenolics; natural polymers represented by cellulosics, lignins, and rubbers; and inorganic polymers represented by the silicones. The lower alkene polyolefins have been found to be particularly useful matrix materials in practicing the present invention, and in particular polypropylene, polyethylene, and mixtures thereof.

Many different materials and types of materials can be profitably used as the filler or additive ingredient for the composites of the present invention. These fillers are preferably although not necessarily selected from those materials classified as brittle, non-metallic solids when in macro or bulk form, such as various types of mineral and elemental materials. It is not considered that the type of material employed for the filler is significant to the present invention, except insofar as the selection of different filler materials may be influenced by the properties desired to be obtained from the composite. Among the filler materials thought most useful for purposes of the present invention is short fibered asbestos, because of its ready availability and inexpensiveness. However, examples of other filler materials that may also be effectively used, are diatomaceous earth, wollastonite, mica, silica, glass fibers, and mineral wool.

As mentioned above, it is thought that the particle size of the additive is an important feature of the invention in effecting a high tenacity union between the surfaces of additive and matrix materials. Although it is not considered essential to the practice of this invention, it is however preferred that the additive particles be short fibers whose geometry and structure provide: single crystal or crystal grain sizes of less than about 0.1 micron average to insure high fiber strength to the particle, a smallest dimension of between about 0.05 micron and about 1 micron, a largest dimension of less than about 44 microns, an average length of greater than about five times the average thickness and greater than the average width. The foregoing dimensional characteristics will in general provide a desired minimum ratio of 10:1 for tensile strength of additive to polymer matrix. In addition, the dimensions recited are small enough to permit extrusion type processing and provide the desired fluid character for the system; while they are large enough to be above the limits of gelling agents, thus avoiding undue viscosity in the system. The distribution of dimensions within the above described limits should preferably approach a normalized, or parabolic distribution curve for maximum packing and flowability. Further, it is preferred as an additional factor in selection of additive and matrix combinations, that the additive modulus of elasticity be greater than that of the matrix polymer, to insure that the matrix or substrate yields preferentially to transmit stress to the filler, and that the ratio of moduli increases, with higher filler concentrations and lower substrate elongation. Additionally, the additive or filler should have less than 1% elongation to provide a desired stability to the structure. Although it is preferred that the additive material be elongate or essentially fibrous in nature, it is not intended to exclude lamellar or granular particles from the scope of this invention, including granular particles that are approximately spherical in shape.

When produced in accordance with the techniques of the present invention, even though the composites are heavily filled with additive as high as and even higher than about 70% by weight, the resultant products usually exhibit good cohesion, flexibility, and tensile strength, sometimes even exceeding the unfilled polymer in one or more of these characteristics, or they have characteristics not found in either of the starting materials. Also, such surface properties as lubricity, friction, hand and feel can be substantially altered by selection of appropriate additives and percentages thereof.

In general, therefore, the present invention enables substantial economies in the production of polymeric products by enabling them to be filled with inexpensive materials to a degree and percentage heretofore found impossible or unfeasible. But more than that, the present invention introduces a new dimension into the art of plastic polymer technology by affording a means for modifying the properties of various polymers in different ways by the use of different additives or adjuvants, and for imparting properties to these composites heretofore unavailable in either the starting polymer or the additive.

It is accordingly one object of the present invention to provide composites of a continuous phase matrix, such as characterized by polymeric materials with adjuvant filler materials.

Another object of the present invention is to provide polymeric matrices filled with large percentages of adjuvant additive materials.

Another object of the present invention is to provide for the filling of polymeric matrix materials with granular, lamellar, or fibrous materials, particularly with large percentages of such additives.

Another object of the present invention is to provide composites of matrix and additive filler materials, wherein the filler particles are submicro in size, and wherein they are substantially uniformly dispersed in the matrix material in substantially non-agglomerated condition.

Still another object is to provide for composites as above-described, wherein the filler or additive particles are combined with the matrix by tenacious intersurface bonding.

And a further object is to provide for composites as above-described, wherein a large surface area per unit mass of the additive is bonded to the matrix material.

An additional object of the invention is to provide mixtures of polymeric and non-polymeric particulate additive materials, wherein the additive particles are tenaciously surface bonded to the polymeric materials, and from which filled polymeric matrix composite articles can be formed by molding, drawing, casting, extruding, rolling, and other usual forming operations.

And a still further object of this invention is to provide such mixtures wherein said surface bonded area comprises a large portion of the overall surface area of the additive material.

Other objects and advantages of the present invention will become apparent to those skilled in the art from a consideration of the following detailed description of exemplary specific examples thereof, had in conjunction with the accompanying drawings in which like numerals refer to like or corresponding parts, and wherein:

As indicated above, pursuant to the present invention composites of polymeric matrix and particulate additive materials are effected preferably by combining the additive into the matrix forming material by means of a high energy rotary impact milling operation. As will be illustrated hereinafter, the resulting composites may possess properties not found in either the matrix or additive starting materials, and in many instances, the plastic properties of the matrix materials are enhanced by the additive, even though the additive per se is characterized as a brittle material, and even when the percentage of additive is very high. It has been found that the character and nature of the properties modification vary depending on the starting materials and on the percentage of additive.

It is understood, of course, that various kinds and designs of rotary impact mills might be employed for effecting the purposes, advantages, and objects of the invention, but in order to facilitate a complete understanding of the invention, one form of high energy impact mill utilized in combining the polymeric and additive materials of some of the subsequent specific examples is described and illustrated herein in detail.

Figure 1:
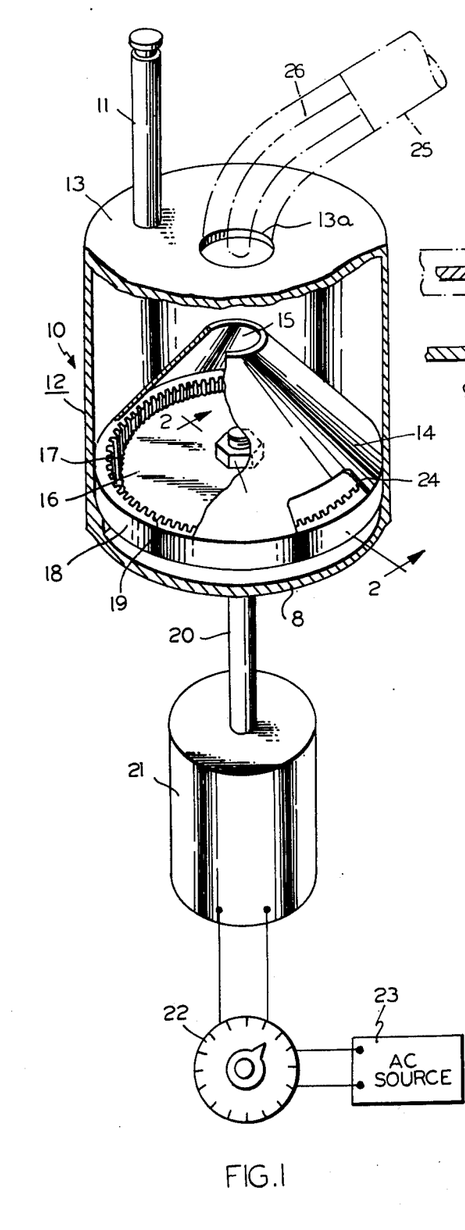
FIG. 1 is a partly schematic and partly isometric view, partially cut away, of one form of high energy mill utilized in preparing some of the specific examples of polymer and additive mixtures described herein.
Figure 2:
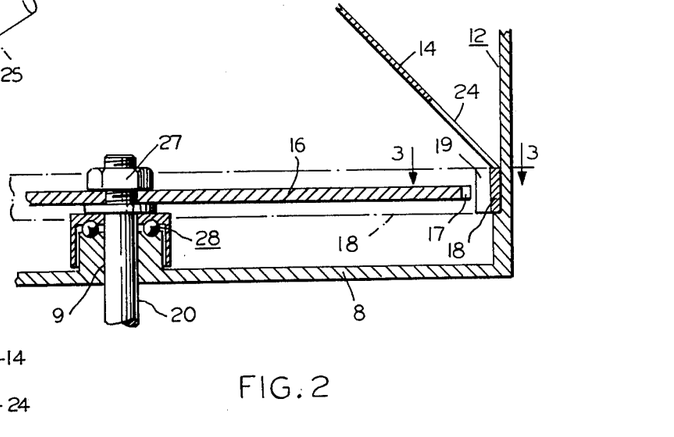
FIG. 2 is an enlarged fragmentary cross-sectional view of a portion of the mill of FIG. 1, taken along lines 2—2 of FIG. 1.
Figure 3:
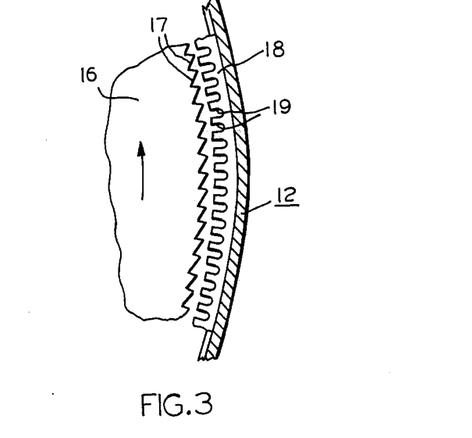
FIG. 3 is an enlarged fragmentary view of a portion of the mill shown in FIG. 1, taken along the lines 3—3 of FIG. 2.

FIGS. 1–3 show a high energy rotary impact mill generally indicated by the numeral 10, which has proved effective in producing the desired high energy impingement of the filler and matrix-forming particles on one another. It consists of a generally cylindrical housing 12 having a top portion 13 with a centrally located inlet and output aperture 13a. A gas inlet pipe 11 is joined to another aperture in top 13 to permit the introduction of a desired gas into mill 10 for certain processing operations. If not used therefor, it may be closed with an appropriate stopper as shown in FIG. 1. Within the housing 12 there is a truncated, conical member 14 whose lower edge is joined to the inner surface of the housing 12 by any appropriate method such as soldering, welding or even in some cases, by the application of adhesives thereto. The upper edge of the cone 14 has a circular opening 15 therein which is substantially coaxial with the aperture 13a. There is also a cutaway portion 24 in the lower edge for recycling as will be explained below.

Below the cone 14 is a rapidly rotating milling member 16 having a central aperture through which the upper end of a shaft 20 passes. In one form, the rotating member 16 may be an eight inch crosscut saw blade No. 2 × 200 having teeth 17 which function as impactors. The member 16 is fixed to the shaft 20 by a nut 27, as shown, or by any other appropriate means. The shaft 20 passes through a central opening 9 in the bottom part 8 of housing 12 and is connected to the rotor shaft of a motor 21 which is, in the example shown, an A.C. motor. A bearing assembly 28 is provided for shaft 20 adjacent the opening 9.

Concentric with the member 16 and located just outside its periphery is a corrugated linear 18 fixed to the inner surface of the housing wall 12. The liner 18 includes a multiplicity of indentations or vertical corrugations 19 having outwardly curved end wall portions as shown.

The motor 21 is connected to an A.C. source 23 via a variable alternating current attenuator 22, sometimes known as a "Variac". Adjustment of the attenuator 22 regulates the voltage and hence the speed of the motor 21 and member 16.

In actual operation, the filler material and the matrix-forming material, both preferably previously comminuted to the size ranges previously described, are introduced into the mill via aperture 13a, the aperture 13a is closed and the motor is started. The particles are subjected to the combined action of the teeth 17 and the liner 18. This action may occur in any desired number of passes. When desired, the impact-blended product, or certain parts thereof may be removed from mill 10 by a vacuum hose or tube 25. If the entire product is to be collected, the end of the hose is placed so as to completely cover the aperture 13a. If just the lighter or finer particles are desired a thinner tube 26 is placed in the end of the hose 25 and inserted downward through the center of aperture 13a. Since the rotating disc 16 imparts centrifugal force to the particles and to the atmosphere within mill 10, the heavier or larger particles are flung more outwardly than the finer lighter particles, thereby enabling extraction of the latter from the central portion by tube 26.

The action of mill 10 is considered to be primarily that of a rotary impact mill, but this is not to exclude the presence of other milling modes, such as attrition and fluid energy milling. It has been found that production of the novel composite materials in accordance with the teachings of this invention can be accomplished for polyethylene and polypropylene matrix materials with impactor speeds of the rotor as low as about 300 linear feet per second, although additionally improved properties of the composites can be obtained with increased impactor speeds, particularly at or above about 600 linear feet per second. As a result of this action, some comminution of the product is had into various sizes. Some of these products will become suspended above the cone 14 but will eventually settle downwards and be reapplied into the milling area proper through the opening 24.

Utilizing the above-described mill for combining polymeric matrix forming materials will particulate additive materials, the following specific examples are illustrative of the manner of forming composites and of the nature of the unexpected and unusual results obtained by the present invention. It is understood that the invention is applicable to other polymeric matrix forming materials and filler materials than those selected as exemplary for purposes of the present illustrations, and it is further understood that the properties of various composites will vary depending upon the matrix material or polymer, the filler or additive, and the proportions selected.

EXAMPLE 1

A short fiber asbestos, such as type CRL81-31 obtained from the Asbestos Corporation of America, was milled and screened to obtain a fraction of fibers having dimensions and ratios of dimensions generally corresponding to the preferred values above-described, and generally ranging in average length from 15 to 20 microns and having an approximate average diameter of 0.5 micron. The resultant asbestos was blended with an isotactic polypropylene (Hercules No. 6823) having a low melt flow (melt index of 0.4 at 230° C. gms/10 min. — ASTM D 1238), in precipitated powder form of granular agglomerates having an ultimate particle size of about 15 microns. The proportion of asbestos to polypropylene was 2:3 by weight. The blending was effected by mixing these ingredients with a sufficient quantity of trichloroethylene to gel the polypropylene in mild heat of about 200° F., until the asbestos was dispersed in the gel. The dispersion was further enhanced by extruding or otherwise generally working the gel. The trichloroethylene was then evaporated, leaving a dry powder. This dry powder was treated in the mill above described and illustrated in FIGS. 1–3, several passes being made with the rotor operating at about 20,000 RPM, to provide a peripheral linear speed of about 500 feet per second, the dried powder was reduced to a very fine and impalpable consistency.

The milled product was molded into a sheet as follows: it was spread between two sheets of tin foil, bolted between two metal plates forming a mold, and squeezed very tightly in a vise; the mold was then placed on a hot plate at 475° F. for 2 to 3 minutes, removed from the hot plate, and instantly chilled in cold water. The resultant product was a coherent pliable plastic sheet, similar in some respects to unoriented polypropylene film.

When heated to about 400° F., this composite turned silvery and became readily drawable. When drawn, it retained its transverse stability much better than plain polypropylene similarly drawn, and exhibited a diminished tendency to split longitudinally.

For additional purposes of comparison, a strip of 20 mil unfilled polypropylene film was drawn to 5.5 – 6.5 mil thickness by 3/16 inch width. It exhibited a tensile strength of 24,000 PSI, while a strip of the present composite 12 mils thick by ⅜ inch wide, drawn to 4.5 – 5 mils thick with a width of 3/16 inch exhibited a tensile strength of 27,000 PSI.

Thus, the present composite material, although filled 40% with submicro mineral particles, exhibited a greater tensile strength and greater resistance to longitudinal spliting than unfilled polypropylene. It is apparent therefore, that the present invention provides a material of substantially reduced starting materials cost, and improved properties that render the composite particularly useful for the manufacture of plastic strapping, as one example of use.

EXAMPLE 2

For purposes of comparison, three runs were made to show the importance of the high energy mechanical milling step in producing the improved composites of the present invention pursuant to the present procedures. In all three runs the same asbestos and polymer were used. The asbestos was the same as, and had been milled and screened to obtain the same particle size as described in Example 1. The polymer was also the same polypropylene as described above in Example 1.

Run A

The premilled asbestos and polymer were mixed or blended together in the weight ratio of 40% additive or filler to 60% polymer in the presence of a sufficient quantity of trichloroethylene to gel the polymer in mild heat of 200° F., until the asbestos was dispersed in the gel. The dispersion was further enhanced by extruding and otherwise generally working the gel. The trichloroetylene was then evaporated leaving a dry powder. This dry powder was compression molded in a circular mold under about 5,000 PSI at about 475° F., to produce a disc of composite material composed of polypropylene matrix and submicro asbestos additive. This disc was about 1 ¼ inches in diameter and between about 1/16 and ⅛ inch in thickness.

Run B

The identical materials, proportions, procedures and conditions as in Run A were followed, except after drying of the gel the resultant powder was impact milled for several minutes under high energy conditions (as described in Example 1) before being compression molded.

Run C

The same submicro asbestos and polypropylene particles as used in Runs A and B were mixed together in the proportions of 45% polymer and 55% asbestos by weight in a ball mill to disperse the ingredients substantially uniformly throughout one another. Without subjecting the mixture to a gelling step, it was introduced directly into the high energy impact mill shown in FIGS. 1–3 and milled in the same manner as Run B. Whereupon, the milled composition was compression molded in the same manner as Runs A and B.

The molded disc or button produced in Run A was brittle, being capable only of about a 15° to 20° bend, followed by an abrupt failure and breaking of the disc. On the other hand, the discs produced in Runs B and C were substantially similar to one another in outward physical properties, and they were both flexible, yielding, and resilient, being capable of about a 90° bend followed by gradual failure.

EXAMPLES 3 – 9

The following tabulation summarizes seven additional specific examples of the invention, and indicates the starting materials, their percentages, the processing procedure, and the properties of the resultant composite products.

Table I

| Ex. | Components | % | Processing Procedure | Properties |
|---|---|---|---|---|
| 3 | App[1] | 30 | Same as | Molded product |
|   | Asbestos[5] | 70 | Example 1 | is brittle with good cohesion. |
| 4 | App | 20 | Same as | Molded product |
|   | IPP[2] | 20 | Example 1 | is brittle with |
|   | Asbestos | 60 |   | good cohesion, extrusion properties are good. |
| 5 | PDPE[3] | 60 | " | Molded Product |
|   | Asbestos | 40 |   | has good cohesion and ductility, extrusion properties are good. |
| 6 | LPE[4] | 60 | " | Molded product |
|   | Asbestos | 40 |   | has good cohesion and ductility, extrusion properties are good, bi-orients on rolling. |
| 7 | APP | 5 | Same as | Molded product has |
|   | IPP | 60 | Example 1, | good cohesion and |
|   | Asbestos | 35 | except high energy milling preceded gelling | ductility, extrusion properties are good, and drawing properties are excellent. |
| 8 | APP | 5 | Same as | Same as Example 7, |
|   | IPP | 60 | Example 1, | except drawing |
|   | Asbestos | 35 | except gelling was omitted | properties not quite as good. |
| 9 | IPP | 35 | Same as | Same as Example 8. |
|   | APP | 5 | Example 1, |   |
|   | Asbestos | 40 | except high |   |
|   | Diatomaceous Earth[6] | 20 | energy milling before and after gelling |   |

[1]APP is an atactic, low molecular weight amorphous polypropylene, having a gum consistency at room temperature.
[2]IPP is an isotactic polypropylene (Hercules No. 6823, ASTM D 1238 melt index

Table I-continued

| Ex. | Components | % | Processing Procedure | Properties |
|---|---|---|---|---| of 0.4 at 230° C. gms/10 min.) of high molecular weight, and being a precipitated powder in granular agglomerates of 15 micron ultimate particle size.
[3]LDPE is an atactic, low density polyethylene, having an ASTM D 1238 melt index of 2.0 at 190° C. gms/10 min., granulated to 30 mesh.
[4]LPE is a linear polyethylene, having an ASTM D 1238 melt index of 5.0 at 190° C. gms/10 min., and granulated to 30 mesh.
[5]Asbestos for all examples is the same as used in Example 1, and premilled as there described.
[6]Diatomaceous earth used is calcined Johns Manville "Celite" No. 319, premilled with the asbestos to submicro size.

In the foregoing Examples 3–9, if the additive were blended with the polymer material in the stated proportions, utilizing only conventional mixing techniques, as described for instance in Example 2, Run A, the properties of the resulting composites would be quite different. In Example 3, there would be no cohesiveness in the molded products; in Example 4, there would be essentially no cohesiveness in the molded product, and it would be essentially useless; in Examples 5 and 6, the molded products would be waxy with poor integrity; and in Examples 7, 8 and 9 the molded products would be brittle, with very poor extrusion and drawing properties.

From the foregoing examples of the present invention it will be seen that the high energy milling operation contributes significantly to the results obtained, and by the use thereof one is enabled to obtain composites having improved and/or different properties from the starting materials. Among the improved properties particularly noticeable are increased tensile strength of highly filled polymers, increased coherence of molded products, improved extrusion and drawing properties and improved resiliency, pliability, ductility and flexibility. Also, since the additive materials applicable to the present invention include lamellar, granular and fibrous materials that may be many fold less expensive than the polymer matrix forming materials utilized, the potential economic advantages of the invention are quite substantial. The foregoing improved properties render the invention particularly useful in the production of strapping or belting, and fibers as for textiles, rope, cord, and the like, as well as many other products.

The following tests qualitatively show that the linear speed of the impactors in the rotary impact milling of the matrix and filler materials has an effect on the nature of the resultant composite, and further, they indicate the presence of a threshold effect as the rotor speed is increased. A mixture of 50% by weight of asbestos and 50% by weight of granular polypropylene were mixed in a common household mixer to obtain a uniform mixture. The asbestos was the same as that used in Example 1 and had been premilled as there indicated; and the polypropylene likewise was the same as described in Example 1. A number of samples from this mix were individually subjected to impact milling in a mill similar to that illustrated in FIGS. 1–3, each sample being milled at different rotor peripheral speeds, and each sample being milled for the same period of time, which was sufficient to expose the entire charge fully to the milling action of the rotor. Thereafter, each milled sample was introduced into a mixture of carbon tetrachloride and isopropyl alcohol having a specific gravity of 1.1, which is between the specific gravity of the asbestos used (2.4) and that of the polypropylene (0.91). These mixtures were each vigorously agitated and then allowed to stand. Samples A and B, which had been milled at rotor peripheral speeds of about 220 and 330 linear feed per second, respectively, quickly separated into two fractions, a floating fraction consisting essentially of polypropylene, and a precipitate fraction consisting essentially of asbestos. In Samples C, D, E, F, and G, which had been milled at rotor peripheral speeds of about 390, 450, 500, 660, and 720 linear feet per second, respectively, essentially the entire charge precipitated, showing that substantially every particle of polypropylene had a significant quantity of asbestos additive combined therewith. A control sample of the unmilled mixture of asbestos and polypropylene, when vigorously agitated in the 1.1 specific gravity liquid, quickly separated into a floating fraction of polypropylene and a precipitated fraction of asbestos, as in the cases of samples A and B.

Two additional samples H and I of the asbestos and polypropylene were gelled and dried as described in Example 2, Runs A and B, and these were then subjected to the impact and attrition milling and separation procedures of the preceding samples. Sample H was milled at a rotor peripheral speed of about 220 linear feet per second, while sample I was milled at a rotor peripheral speed of about 660 linear feet per second. In the floatation separation procedure, sample H divided into two fractions, a polypropylene floating fraction and an asbestos precipitated fraction, the same as samples A and B and the control sample; while in sample I the entire charge settled out as a precipitate of combined polypropylene and asbestos.

A further sample J of the asbestos and polypropylene mix was ball milled for four hours. Upon introduction and vigorous agitation in the 1.1 specific gravity fluid, it separated into a floating fraction consisting essentially of the polypropylene and a precipitated fraction consisting essentially of the asbestos.

The same results as indicated with samples A-J and the control were obtained utilizing a starting mix of 50% of the same polypropylene and 50% of a granular asbestos type ST as sold by Johns Manville.

The foregoing floatation runs show that at a certain energy level of impact milling one obtains significant adhesion between the asbestos and the polypropylene. With the present materials and mill, this energy level appeared to be obtained at a rotor peripheral speed of between about 330 and 390 linear feet per second. Below this speed the polymer and asbestos particles did not combine with sufficient tenacity to prevent substantial separation when agitated in the floatation fluid. Similarly it has been shown that ordinary processing procedures for forming filled plastics, such as ball milling or gelling and working, do not effect this adhesion between matrix material and additive, which constitutes a significant feature of the present invention.

This adhesion feature in the powder composite carries through to the molded product. Samples corresponding to A and F above after being milled at rotor speeds of 220 feet per second and 660 feet per second, respectively, were each molded at about 425° F. to 450° F. and about 5000 pounds per square inch. In the A sample, the asbestos additive was highly agglomerated, it drew very poorly, had poor cohesion, was brittle, and had a tensile strength as molded of only 1600 pounds per square inch. On the other hand, the F sample had a very uniform and substantially nonagglomerated dispersion of asbestos additive, it drew much better than the A sample, had good cohesion, was flexible, and had a tensile strength as molded of 3200 pounds per square inch. A correspondingly molded sample of the unfilled polypropylene showed a tensile strength as molded of 3500 pounds per square inch.

EXAMPLES 10 – 16

The following examples are intended to show quantitatively the effect of various rotary impact milling speeds, and they dramatically illustrate the threshold effects alluded to above. For these examples, a stock mixture was prepared consisting of 50% polypropylene and 50% asbestos, the polypropylene being stabilized with 1% di-stearyl thiodiproprionate and 1% of a substituted phenolic antioxidant. The polypropylene was a linear polypropylene having a melt flow index of 2.0 at 230° C. (ASTM D1238), and the asbestos was a short fiber material having a particle size substantially the same as described in Example 1. A uniform mixture was prepared by passing the polypropylene and the asbestos together through a rotary impact mill of the type manufactured by Entoleter, Inc., and sold under the Trademark Centrimil, and is of a type illustrated in U.S. Pat. No. 3,171,604, issued to K. H. Conley, et al. In this mill, the impactors were set close to the periphery of a rotor having a diameter of 27 inches. To effect the mixture without obtaining any significant degree of high energy impacting, the rotor was operated at only 2,450 RPM (approximate impactor speed of 289 linear feet per second), and the temperature of operation was held below 110° F. Various samples of this material were then impacted at different rotor speeds in said Centrimil rotary impact mill, and at selected temperatures of operation, as set forth in Table II.

Table II

| Example No. | Polymer Size (equivalent spherical diameter) | Rotor RPM | Impactor Speed (ft./sec.) | Temp. °F |
|---|---|---|---|---|
| 10 | 50 | 2450 | 289 | 200 |
| 11 | " | 3550 | 419 | 250 |
| 12 | " | 4100 | 484 | 250 |
| 13 | " | 5200 | 614 | 250 |
| 14 | " | 7000 | 825 | 250 |
| 15 | "5200 | 614 | 110 | |
| 16 | Ca.200 (flake) | 5200 | 614 | 250 |
| 17 | 50 | 3000 | 353 | 250 |
| 18 | " | 4900 | 578 | 250 |

Samples of the foregoing impacted examples 10–18 were then subjected to several tests. In the first test the samples were injection molded at 475° – 525° F. at a pressure of 8,000 psi on a 1¼ inch ram, and the molded products were then tested for bar tensile strength in accordance with ASTM test D638. The results as set forth in Table III, column A, and for comparison purposes it is noted that the unfilled polypropylene would have a bar tensile strength of about 4000 psi. The second test was a floatation-separation test, wherein samples of each of the impacted examples 10–18 were separately placed in carbon tetrachloride(density 1.6), vigorously shaken, and centrifuged. This resulted in a floating fraction and a submerged bottom fraction, and the two were separated. The floating fraction comprised all the polypropylene and all the asbestos carried therein, since the density of polypropylene and even a 50–50 mixture of the polypropylene and the asbestos is less than that of carbon tetrachloride, while the density of the asbestos is greater than that of the carbon tetrachloride. The weight percent of the floating fraction and the percent of starting asbestos present in the floating fraction was determined, and is set forth in Table III, columns B and C. In the third test, impacted samples of examples 10–16 were pelletized and extruded in a 1½ inch extruder at die pressures of between 500 and 1000 psi and extruder and die temperatures of between 300° and 400° F. The samples were passed through the extruder twice, and with each pass bar tensile strength measurements were made in accordance with ASTM test D638. These results are tabulated in columns D and E of Table III. Also, filament tensile strength measurements were made on the two-pass samples on a 1 inch extruder, and this data is presented in Table III, column F.

280 to 500 linear feet per second, whereas the deagglomeration enegy threshold is being passed, the distribution of filler in the matrix material still remains largely a surface phenomenon, permitting much of the filler to be shaken from the matrix particles during the vigorous shaking of the floatation test. And at the same time some of the filler particles certainly would be adhered to the matrix sufficiently to resist this shaking action. However in the 500 to 650 linear feet per second of impactor speed range, the bonding and imbedding energy threshold of filler in matrix material is exceeded so that only a very small percent of the filler is shaken loose by the agitation of the floatation tests.

These conclusions are further confirmed by the tensile strength tests of the extruded samples, presented in Table III

| Example No. | A<br>Tensile Strength (psi) | B<br>% with Density less than 1.6 | C<br>% Asbestos in Floating Fraction | D<br>Tensile Strength, One-pass Extrusion (psi) | E<br>Tensile Stength, Two-pass Extrusion (psi) | F<br>Filament Strength, Two-pass Extrusion (gpd) |
|---|---|---|---|---|---|---|
| 10 | 2,870 | 63.2 | 26.4 | — | — | 1.3 – 2.5 |
| 11 | 3,490 | 63.0 | 26.0 | 3910 | 4030 | 2.5 – 3.2 |
| 12 | 3,580 | 64.9 | 29.8 | 4050 | 4190 | 2.0 – 3.5 |
| 13 | 4,135 | 84.5 | 69.0 | 4290 | 4200 | 2.9 – 3.5 |
| 14 | 4,345 | 91.7 | 83.4 | — | 4400 | 1.9 – 3.5 |
| 15 | 3,690 | 60.6 | 21.2 | 3990 | 4180 | 1.8 – 3.4 |
| 16 | 2,970 | 60.7 | 21.4 | 3900 | 4090 | 2.1 – 3.4 |
| 17 | 3,620 | 62.6 | 25.2 | — | — | — |
| 18 | 3,720 | 71.2 | 42.4 | — | — | — |

Figure 4:
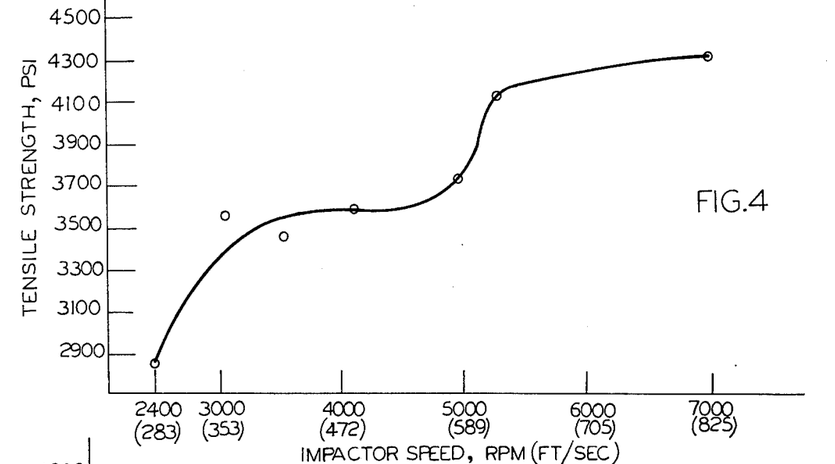
FIGS. 4–6 are graphic plots of certain test results, illustrating certain features of the present invention.

In order more graphically to illustrate the results obtained, a plot of the tensile strength (Table III, column A) against rotor impactor speed (Table II) is presented in FIG. 4, for Example Nos. 10–14 and 17–18. A plot of the weight percent constituting the floating fraction (Table III), column B) is plotted in FIG. 5 against rotor speed (Table II), for Example Nos. 10–14 and 17–18. FIG. 6 presents a plot of one-pass extruded sample tensile strength (Table III, column D) versus rotor speed at which the sample was milled prior to extrusion (Table II), for Examples Nos. 11–14; and for clear comparison purposes the plot of FIG. 4, tensile strength of milled non-extruded sample versus rotor speed, is superimposed thereon in a dotted line curve.

Figure 5:
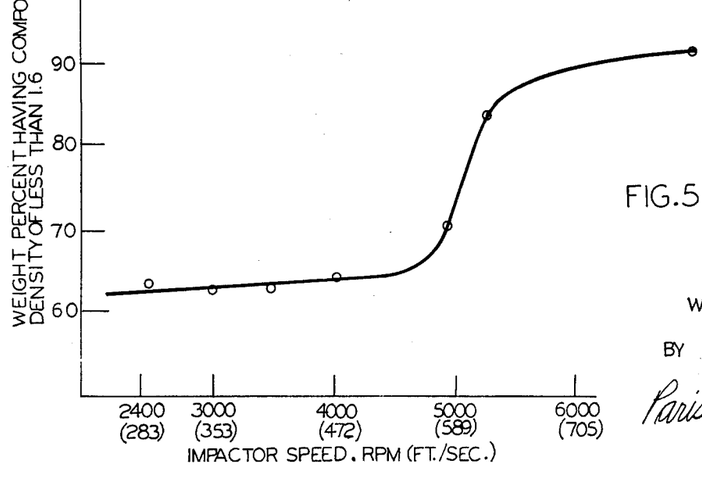
Figure 6:
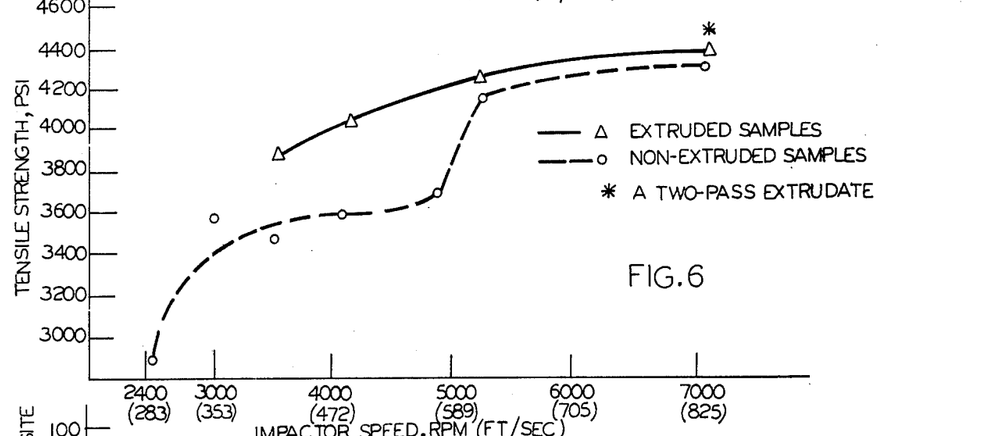

From the data presented in Tables II and III, and particularly as illustrated in the graphic plots of FIGS. 4–6, it is noted that in the tensile strength tests of FIG. 4 and the floatation tests of FIG. 5, certain inflection points occur. In FIG. 4, a first tensile strength inflection point occurs about a center of impactor speed of approximately 300 linear feet per second, and a second inflection point occurs about a center of impactor speed of approximately 600 linear feet per second. In FIG. 5, an adhesion of filler to matrix inflection point occurs about a center of impactor speed of approximately 600 linear feet per second. The conclusions that are proposed to be draw from these experimental observations are that: the first inflection point in tensile strength indicates that sufficient energy is being imparted to the resin and filler mix to obtain deagglomeration of the filler particles and the uniform distribution of the individual submicro particles over the surface of the matrix particles; while the second inflection point indicates the deagglomerated adhered filler particles are being driven with sufficient impact force to become embedded in and bonded to the matrix particles with great adhesion between the disparate surfaces.

The foregoing conclusions are confirmed by the floatation graph, FIG. 5. In the impactor speed range of FIG. 6. First attention is drawn to Example 2, and a comparison of Run A and Run B. It will be observed that merely extruding a normal mixture of filler and matrix material does not produce the results of the present invention. On the other hand, FIG. 6 shows that if a mixture of filler and matrix is impact milled to the point where it is past the threshold of FIG. 4, and is then extruded, the tensile strength of the extrudate is immediately brought up to approximate that obtained at the second threshold of FIG. 4. Thus, consonant with the foregoing theory, it would not be expected that extrusion alone could effect the deagglomeration and uniform dispersion of filler throughout the matrix material, and indeed the experimental evidence indicates that it doesn't. At the same time, once the deagglomeration and uniform dispersion is obtained, extrusion would be expected to obtain the high compression energy required to bond and unite the individual filler particles with the matrix material in the same way as high energy impact milling does. And indeed such is the result indicated by FIG. 6.

The present theory is further confirmed by visual microscopic observation. It has been observed that sheets molded after high energy milling of polymer and additive, such as Example 2, Run B, and Examples 10–18, have an extremely uniform dispersion of the additive particles, and they appear to be dispersed as nonagglomerated individual particles; while molded sheets formed in the absence of such milling, as for example by the procedure described in Example 2, Run A, showed a rather non-uniform dispersion of additive particles in the substrate, and the particles appeared in large measure to be dispersed as agglomerates of particles.

To further support the aspect of the analysis of the invention pertaining to the surface bonding of the filler or additive particles to the polymer matrix, a surfactant was added to the composite. A number of samples were prepared essentially identical in composition and processing to the two-pass extrusion samples of Example 12, except that between the milling and pelletizing steps the composite was hot ball milled with 5% by weight of the surfactant Duomeen T (1.3 tallow propylene diamine). The extruded samples showed tensile strengths of from 3.8 to 5.1 grams per denier. By comparison with Example 12, Table III, Column F, it will be seen that the addition of the surfactant greatly improved the tensile strength of the composite.

Thus it is submitted that the present invention is comprised of two basic features. The first basic feature is dispersion of the filler particles throughout the matrix particles to obtain a deagglomerated substantially homogeneous mix of the two materials. The preferred mode of obtaining this result is to mill the two materials together in a rotary impact mill, with sufficient energy to effect the dispersion, such as at impactor speeds of about 300 linear feet per second. The second basic feature is obtaining high adhesion bonding forces between the dispersed filler particles and the matrix material. This is accomplished by subjecting the homogeneous mix to very high compression type pressures, preferably by incrementally subjecting small portions of the material to very high energies. High speed rotary impact milling at impactor speed of about 600 linear feet per second, or higher, is the preferred mode of obtaining these compression pressures. Alternatively, similar results can be had by extruding the homogeneous material through a small orifice, at high pressures, of for example of the order of about 500 to 1000 psi. Although it is preferred in practicing the present invention to employ both the foregoing basic features, it is of course apparent that the first feature, deagglomeration and dispersion, does itself provide useful improvements.

The submicro size of the filler material is quite significant, in that it provides a very large surface area per unit mass of filler for bonding with the matrix material. Also the relatively fine size of matrix particles used is also a contributing factor to the results of the present invention, in that it facilitates a more uniform distribution of filler particles during the dispersion phase of the invention than would be obtained if large granules of matrix were employed. The latter factor is illustrated by a comparison of Examples 13 and 16, wherein the sole difference between the examples is the fact that in 13 the polymer particle size is less than fifty microns, and in 16 the polymer particle is a flake of about two hundred microns equivalent spherical diameter. It will be observed from Table III that the tensile strength (col. A) and the adherence of asbestos to the polymer (cols. B and C) are much greater for Example 13 than for Example 16.

One additional factor may be noted from Tables II and III, and that is that moderately elevated milling temperatures which modify the plasticity of the polymer improve the results obtained over low temperature milling, as would be expected from the theories previously advanced when dealing with thermoplastic matrix materials. This point is illustrated by a comparison of Example 15 (milling temperature of less than 110° F.) with equivalent Example 13 wherein the milling temperature is 250° F. It will be observed from Table III that the tensile strength (col. A) and the adherence of asbestos to the polymer (cols. B and C) are much greater for Example 13 than for Example 15. This observation indicates that the optimum processing parameters and the results herein indicated for particular polymers, may likely vary somewhat for other resins, depending upon the plastic properties of the material, and may likewise vary somewhat depending upon plasticizer and like ingredients that may be incorporated with the polymer. Such variations would of course be contemplated by the present invention.

The foregoing detailed description of specific examples of the present invention is provided for illustrative purposes only, and many modifications and variations of the invention will be apparent to those skilled in the art. Accordingly, those variations and modifications which are embraced by the spirit and scope of the appended claims are contemplated as being within the purview of the present invention.

What is claimed is:

1. A method of forming a composite particulate material having a plastic, particulate, integratable ingredient capable of being formed into a continuous phase, coherent body and a particulate additive ingredient of submicro particle size, comprising impact milling of said two ingredients in a rotary mill at a linear speed for the impactors of the mill of at least about 300 feet per second to cause the additive particles to deagglomerate and adhere to the plastic particles as substantially non-agglomerated individual particles until at least about twenty percent of weight of the composite is said additive.

2. A method as set forth in claim 1, wherein said percentage is at least about 50.

3. A method as set forth in claim 1, wherein said plastic ingredient comprises polypropylene or polyethylene.

4. A method as set forth in claim 1, and including applying a higher level of additional energy to the particles incrementally, said additional energy causing said additive particles to adhere tenaciously with said plastic material.

5. A method as set forth in claim 4, wherein said additional energy is applied to the material by impact milling the material in a rotary impact mill.

6. A method as set forth in claim 5, wherein said additional energy is obtained by imparting a rotary speed to said mill so as to provide a linear speed to the impactors of the mill of at least about 600 feet per second.

7. A method as set forth in claim 6, wherein said plastic ingredient is polypropylene or polyethylene.

8. A method as set forth in claim 4, wherein said additional energy is applied to the material by extrusion of the material.

9. A method as set forth in claim 1, wherein the impactors attain a linear speed substantially in excess of 300 feet per second.

10. A method as set forth in claim 1, wherein the linear speed of said impactors is at least about 600 feet per second.

11. A method of forming a composite material from a first particulate ingredient capable of being formed into a continuous phase coherent plastic body, and a second particulate ingredient of submicro particle size, said submicro particles having a tendency to cohere into agglomerates, comprising impact milling said two ingredients together by suspending them in a rotary impact mill, and driving said mill at an impactor speed that is sufficient to cause a mix of said two particulate ingredients with a dispersion of said second particulate ingredient throughout said mix and to cause said second ingredient particles to deagglomerate and adhere to said first ingredient particles as substantially non-agglomerated individual particles, until at least about twenty percent by weight of the composite is said second ingredient.

12. A method as set forth in claim 11, wherein said percentage is at least about 50.

13. A method as set forth in claim 11, wherein said first ingredient comprises polypropylene or polyethylene.

* * * * *